United States Patent Office 3,706,827
Patented Dec. 19, 1972

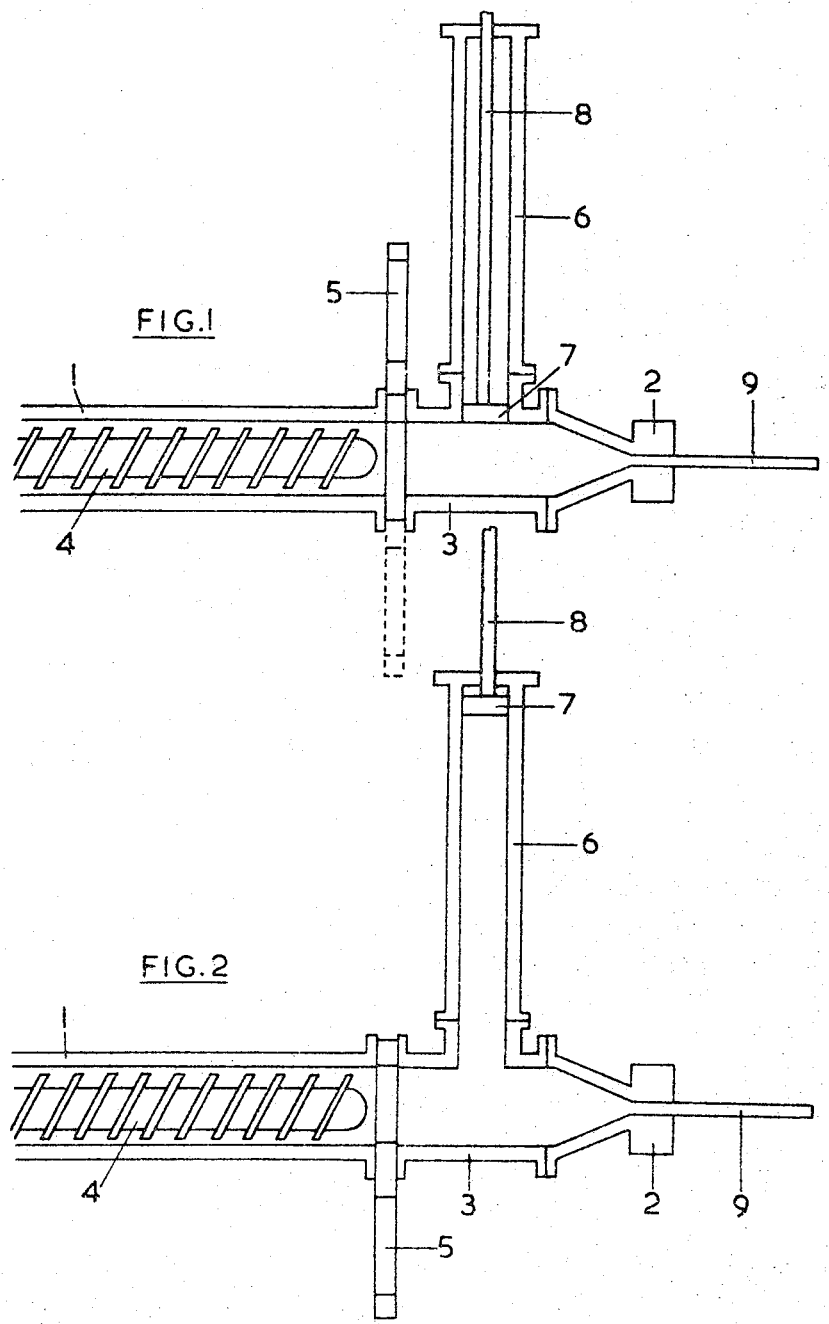

3,706,827
METHOD FOR FLOW RATE CONTROL
Robert Edward Nott and David Robin Lander, Welwyn Garden City, England, assignors to Imperial Chemical Industries Limited, London, England
Continuation of abandoned application Ser. No. 809,163, Mar. 21, 1969. This application June 2, 1971, Ser. No. 149,372
Claims priority, application Great Britain, Mar. 28, 1968, 14,964/68
Int. Cl. B28b *3/20*
U.S. Cl. 264—176
4 Claims

ABSTRACT OF THE DISCLOSURE

A method and apparatus which allows a substantially constant flow rate of viscous material through a die while permitting variations or interruptions in the flow at an earlier stage, by means of providing for changes in the available capacity for the viscous material prior to the die.

---

This is a continuation of application Ser. No. 809,163, filed Mar. 21, 1969 now abandoned.

This invention relates to a method and apparatus for the control of flow rate, in particular for the control of the flow rate of viscous materials such as molten thermoplastics.

Thermoplastic materials are often fabricated by extruding them through a die in the form of, for example, a film, a tape, a monofilament, a fibre or other section. In many of these processes it is important that the rate of flow of the plastic material through the die should be maintained relatively uniform, and, in particular, it is normally essential that the flow should not completely stop, even for a short time, since this leads to a break in the fabricated material. Such a break often takes a long time to repair, particularly if the extruded material then proceeds through further fabricating stages as, for example, in the drawing of fibres, filaments or films. It is, however, often necessary momentarily to break the flow of molten material prior to the die, for example, in order to change a filter, which filter is often positioned between the extruder and the die. It is an object of the present invention to allow such breaks in the flow of material while still maintaining a continuous and uniform flow through the die.

Accordingly, we provide a method for maintaining a predetermined, substantially uniform flow rate of a stream of viscous material through a die in which when the rate of flow of said stream of material at a position prior to the die is greater than said predetermined flow rate, then the available capacity for said material between said position and said die is increased to such an extent that the predetermined flow rate through the die is obtained, and when the flow rate at said position is less than the predetermined flow rate than the available capacity for said material between said position and said die is decreased so to achieve said predetermined flow rate through the die.

What is meant by substantially uniform flow rate will depend on the particular application and the sensitivity of the material issuing from the die or of subsequent fabricating operations to changes in flow rate, but normally deviations not greater than 15% are acceptable. In a preferred embodiment of our invention the available capacity is altered only when a major change in flow rate is anticipated, for example, because of a proposed complete stop in flow for a short time. In this case the capacity may be beforehand gradually built up to the required degree, for example, at such a rate that a small decrease, e.g. less than 15%, in the rate of flow of viscous material through the die results. This may be done in conjunction with increasing the rate of supply of viscous material. When the capacity has been increased to the desired extent, the flow of viscous material from the extruder or other source may be completely stopped and the flow through the die maintained at substantially the same rate by reducing the capacity and thus expelling viscous material which had been contained therein through the die. Such a situation often arises when changing filters, but it is also useful in other cases of momentary stoppage such as might arise, for example, because of a blockage in the feed of thermoplastic to the extruder.

According to one aspect of the invention the available capacity which may be increased or decreased according to our invention is provided by a reservoir of adjustable capacity into which material may be directed from the flow and from which material may be injected into the flow. In this case it is preferred that the reservoir is so constructed that it can completely discharge all of its contents so that no material is left in the reservoir for any extended period of time and thus there is a reduced possibility of decomposition or other deterioration in the material, which might well arise in the case of certain molten thermoplastics.

According to another embodiment of our invention, the said available capacity may be provided by increasing the volume of the passage or passages through which the stream of material flows between the said position prior to the die and the die, while maintaining the flow of viscous material through the said passage or passages. This automatically ensures that there is no "dead space" in which the viscous material may accumulate and thus there is again no possibility of decomposition.

According to our invention we also provide an apparatus comprising means for forwarding a stream of viscous material through an enclosed system, and thence through a die in which said enclosed system is so constructed that its internal volume can be varied and is provided with means for increasing said volume and means for decreasing said volume.

According to one embodiment of the invention the apparatus comprises an enclosed channel terminating in a die, means for forwarding a stream of viscous material along said channel and through said die in which a reservoir is connected to said channel, said reservoir having means for withdrawing said viscous material into itself from said channel and means for expelling said viscous material from itself into said channel. Preferably, the said channel comprises that part of the extruder along which viscous material passes prior to emerging from the die lips. Since the viscous material in said channel is in most instances under pressure, the viscous material will normally tend to flow into said reservoir unless met by some restraining force. Thus, in practice, said means for withdrawing and said means for expelling the viscous material are often one and the same, withdrawal or expulsion being determined by the value of the restraining force with respect to the pressure in said channel.

According to one aspect of this embodiment, said reservoir is capable of completely discharging all of its contents into the channel. The reservoir may be in the form of a chamber of uniform cross section attached to the wall of said channel and having a closely fitting piston which can be withdrawn into the chamber to allow filling of the reservoir and pushed out of the chamber to accomplish discharge of the contents of the reservoir. In this case, the head of the piston is preferably so constructed that, when it has completely expelled the contents of the reservoir, it forms a flush fitting part of the wall of said channel.

Another method which may be used in order to ensure that the dwell time of the polymer in the reservoir is not too long is to provide a leak at the end of the reservoir most remote from the said channel, the material lost through such a leak being recovered for future re-use.

The reservoir may be provided with suitable heating and/or a cooling means as necessary, in order to regulate the temperature of its contents.

According to another aspect, our apparatus comprises means whereby the axial channel or channels along which the viscous material is forwarded can be increased and decreased in volume. Ways in which this may be done include, for example, (a) constructing the axial channel or channels so that they telescope into one another, (b) flexing the walls of the axial channel or channels, (c) providing a double headed axially hollow piston between two channels of differing cross-section. Such systems are described hereinafter with reference to specific embodiments.

The method for activating said means for increasing said volume and said means for decreasing said volume may be linked to a flow meter placed adjacent to the die so that by means of suitable automatic control mechanism the rate of flow through the die is maintained substantially constant. In the case when the internal volume of the said enclosed system is only varied when major momentary interruptions in flow occur, for example, in changing of the filter, then the action of stopping the flow, for example, the moving of the filter, may be used to activate the decrease in said volume.

The method and apparatus of the present invention may be used in connection with all kinds of viscous materials, for example, rubbery materials, resins and glues, but we have found that it is particularly suitable when used in conjunction with molten plastics materials, for example, polyolefines such as polyethylene, polypropylene or polystyrene, polyvinyl chloride, polyamides or polyesters.

The invention is further illustrated, but in no way limited by the accompanying drawings in which FIG. 1 is schematic cross-section through a film extrusion apparatus showing the reservoir in its fully discharged position.

FIG. 2 shows the reservoir with its piston retracted.

In FIG. 1 the barrel, 1, of an extruder is connected to the die assembly, 2, by means of a connecting piece, 3. The screw, 4, of the extruder is located within the barrel, 1, and the filter assembly, 5, between barrel, 1, and connecting piece, 3. Formed in the wall of connecting piece, 3, is an orifice to which is connected reservoir, 6. Reservoir, 6, has a close-fitting piston, 7, which is activated through a piston, 8, by hydraulic means (not shown). The filter assembly, 5, is slidable from the position shown in full lines in FIG. 1, to the position shown in dotted lines in that figure, thus replacing filter unit, 5a, by a fresh unit, 5b. In operation, when it is desired to change the filter element by sliding the filter assembly, the piston, 7, is gradually withdrawn into reservoir, 6, so that polymer flows into the reservoir at a rate of, for example, about 5% of that at which it flows through the die, 2, in the form of film, 9. The filter assembly is then switched and simultaneously the means for activating the piston, 7, to expel polymer at a sufficient rate to maintain the flow of polymer through the die while the flow through the filter assembly is stopped, is commenced. The timing of these operations is synchronised so that the piston reaches its full home position just as the flow of polymer through the new filter is established.

Figure 3:
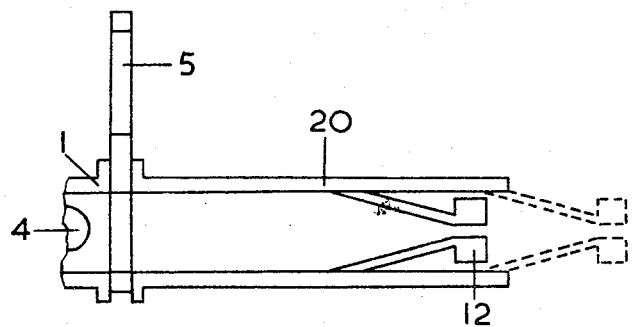
FIGS. 3, 4, 5, 6, 7 and 8 are schematic cross-sectional representations of further alternative embodiments.

In FIG. 3 is shown an alternative embodiment in which the barrel of the extruder, 1, is connected to a tubular member, 20. Within tubular member 20, there slides a die assembly, 12. The full lines in FIG. 3 show the assembly, 12, in its most withdrawn position, and the dotted lines show it in its fully extended position. In either of these positions or in any intermediate position there is a continual flow of viscous material through the assembly.

Means are provided (not shown) for moving the die assembly, 12, from the extended position to the withdrawn position and vice versa. In operation, when it is desired to change the filter assembly, the die assembly is gradually moved from the position shown in full lines to the position shown in dotted lines. The filter assembly is then switched and simultaneously the die assembly is returned to the position shown in full lines at such a rate that polymer is extruded through the die at the appropriate rate. The timing of these operations is synchronised so that the die assembly, 12, reaches its full home position just as the flow of polymer through the new filter is established.

Figure 4:
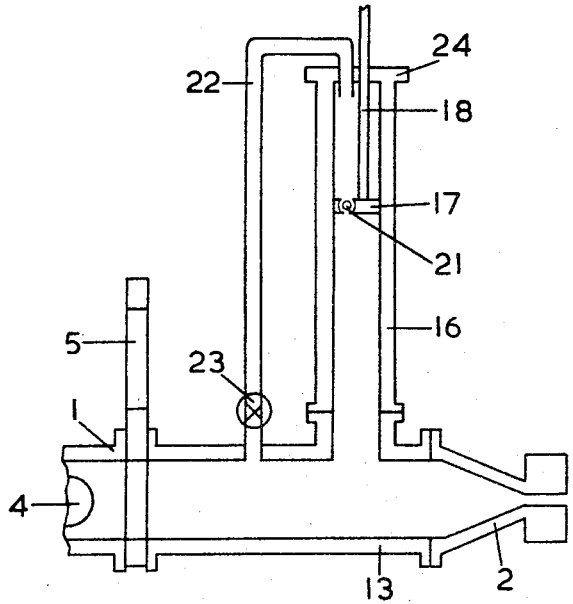

FIG. 4 shows another possible embodiment of the present invention in which the barrel, 1, of the extruder is connected to the die assembly, 2, by means of a connecting piece, 13. This connecting piece is provided with a cylindrical reservoir, 16, within which slides a close fitting piston, 17, controlled by a piston rod, 18, which is activated by means not shown. The piston, 17, is provided with a non-return valve, 21, and a pipe, 22, which is provided with a shut-off valve 23 which connects the part, 13, independently to the top end of the cylinder through a hole in its end plate, 24. During normal operation the polymer as well as flowing through the connecting piece, 13, also when the shut-off cock, 23, is in the open position passes up through pipe, 22, and into the upper part of reservoir, 16. From there it continually passes through the non-return valve, 21, in the piston 17, thus returning via the lower part of the reservoir to the connecting piece, 13. If necessary baffles may be provided within connecting piece, 13, to ensure that at least some of the polymer flow takes place through the circuit, 23, 22 and 21. During normal operation therefore there is a continual flow of polymer through the reservoir, 16, and thus there is no material which is stagnant within that reservoir. When it is desired to change the filter assembly the piston, 17, is withdrawn to the top of the reservoir, 16, and the valve, 23, shut to prevent flow from the connecting piece, 13, along the pipe, 22. The piston, 17, is then depressed and since no flow of polymer can occur in the reverse direction through the non-return valve, 21, the polymer is extruded through the die assembly, 2. As in the other embodiments described above these operations are synchronised so that the flow of polymer through the new filter is established just when the flow of material from the reservoir, 16, stops.

Figure 5:
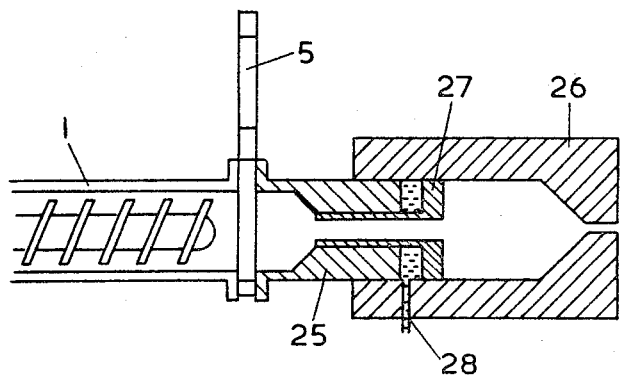
Figure 6:
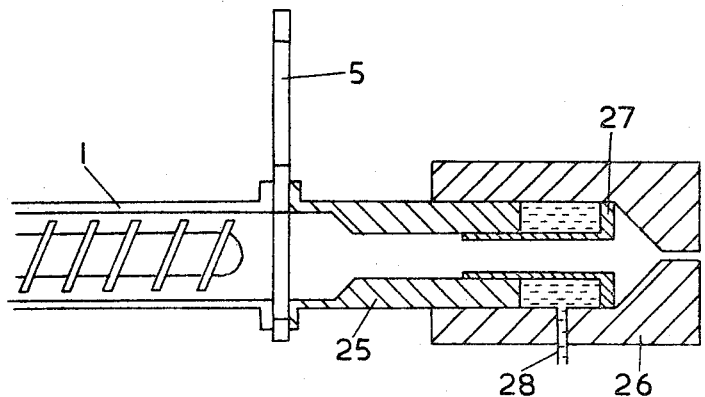

FIGS. 5 and 6 relate to a further embodiment of the present invention wherein the extruder body 1 and filter unit 5 are as previously described. The unit 26 containing the die is attached by means of a screw thread to a piece 25 which is in turn attached to the body, 1, of the extruder. The inner surfaces of parts 25 and 6 are cylindrical and within them slides a close fitting piston, 27. By means of an aperture, 28, in the part, 26, hydraulic fluid may be injected behind the larger diameter end of the piston. Under normal running conditions the piston is moved to the position shown in FIG. 6 by injection of hydraulic fluid and, when it is desired to change the filter 5, the piston is gradually allowed to fall back to the position of FIG. 5 by means of so reducing the pressure of the hydraulic fluid that the fluid is forced out of the aperture behind the larger diameter end of the piston by the pressure of the molten polymer. The filter is then changed and simultaneously the pressure of the hydraulic fluid is increased thus forcing the piston from the position shown in FIG. 5 to that shown in FIG. 6. Since the internal diameter of member 26 is much greater than that of member 25, this results in a considerable decrease in volume and the polymer so displaced is extruded from the die. As in the other embodiments described above this operation is so synchronised that it is completed just as the flow of polymer through the new filter is established.

Figure 7:
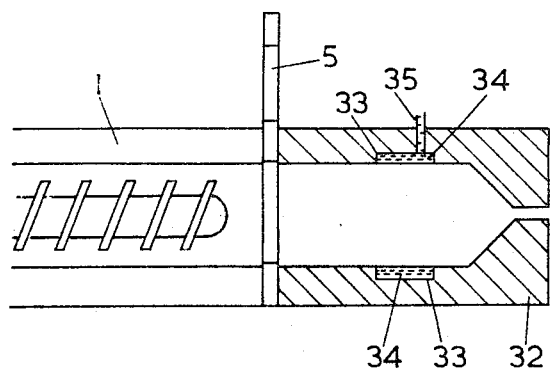
Figure 8:
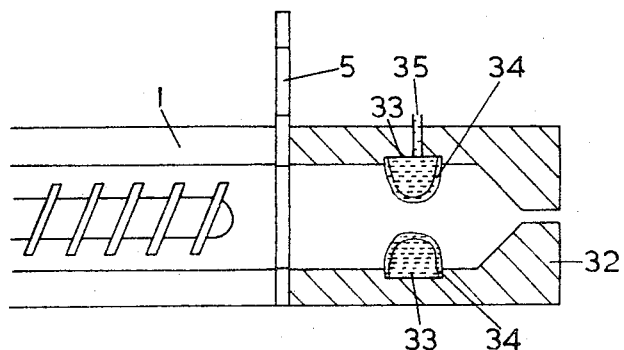

In FIGS. 7 and 8 is shown an embodiment in which the body, 1, of the extruder and the filter, 5, are as before but the die assembly is included in a unit 32, within which there is a circumferential recess, 33. Within this recess, 33, fits a flexible and elastically extendable member, 34, which at each end is bonded to the sides of the recess, 33. A channel, 35, for the injection of hydraulic fluid is provided through the wall of member 32, into the recess 33, and when hydraulic fluid is forced along this channel the flexible and extendable member, 34, is distorted to the configuration shown in FIG. 8. In operation, therefore, when it is desired to change the filter 5, hydraulic fluid is injected through channel 35 and the members 34 distorted to the position shown in FIG. 8, this operation being synchronised with the changing of the filter so that as soon as the members 34 have reached their fully distorted position the flow through the new filter is re-established. The member 34 is then during subsequent extrusion allowed to gradually resume the position shown in FIG. 7, this being done at such a rate that the flow of polymer through the die is not significantly reduced.

The present invention as well as ensuring a substantially uniform flow rate from the die also ensures that the pressure within the channel or channels connecting the extruder to the die remains substantially constant. As a result of this and the pressure in the body of the extruder, a region of high pressure is maintained on either side of the filter and, when the filter is changed, any air included within the new filter is expelled as the filter enters the said region of high pressure. The considerable disadvantage of air bubbles being included within the extruded material and consequent deterioration in its properties is thus avoided.

The following example illustrates the invention.

EXAMPLE 1

Polypropylene was extruded through the apparatus shown in FIG. 1 at a rate of 70 lb. per hour. The dimensions of the reservoir, 6, were 5 inches long by 1 inch in diameter, that is such as to provide an internal capacity sufficient to give about 3 seconds of output at a rate of 70 lb. per hour. The reservoir was slowly filled over about 1 minute shortly before it was desired to change a filter assembly, thus reducing the flow rate through the die during this time to about 67 lb. per hour. The filters were then changed and the contents of the reservoir simultaneously expelled and when, after 3 seconds, this had been accomplished the polymer was again flowing through the new filter and through the die at a rate of 70 lb. per hour. The quality of the extruded film remained substantially unchanged throughout this operation.

We claim:

1. A method for flowing a stream of viscous material through a system which includes a predetermined position past which the material flow to a die and for maintaining a predetermined, substantially uniform flow rate through the die when the flow rate at said predetermined position is interrupted, said method comprising: maintaining a constant flow rate through the die and increasing the capacity of the system for the material between said predetermined position and said die prior to interrupting the flow of the stream of material at said predetermined position while interrupting the flow at said predetermined position; continuing to maintain a constant flow rate through the die by decreasing the capacity of the system for the material between said predetermined position and said die; and then reestablishing the flow at said predetermined position.

2. A method as in claim 1 wherein the step of increasing the capacity of the system includes flowing the viscous material into a reservoir of adjustable capacity.

3. A method as in claim 2 wherein the steps of decreasing the capacity includes discharging all of the viscous material from the reservoir.

4. A method as in claim 1 wherein the viscous material flows through at least one passage of adjustable volume extending between the predetermined position and the die and wherein the steps of increasing and decreasing the capacity of the system includes increasing and decreasing, respectively, the volume of the passage.

References Cited

UNITED STATES PATENTS

| | | | |
|---|---|---|---|
| 3,127,637 | 4/1964 | Rex | 264—349 X |
| 3,135,994 | 6/1964 | Skinner | 18—12 M UX |
| 3,245,115 | 4/1966 | Ecklund | 18—30 AH X |

ROBERT F. WHITE, Primary Examiner

T. E. BALHOFF, Assistant Examiner

U.S. Cl. X.R.

264—349; 425—197, 244